Sept. 22, 1959 G. RALSTON 2,905,751

MONOCHROME CHANNEL BANDWIDTH MODIFYING APPARATUS FOR COLOR TELEVISION RECEIVER

Filed March 25, 1955

WITNESSES:

E. A. McCloskey

J. J. Callahan

INVENTOR

George Ralston.

BY F. E. Browder

ATTORNEY

United States Patent Office 2,905,751

Patented Sept. 22, 1959

2,905,751

MONOCHROME CHANNEL BANDWIDTH MODIFYING APPARATUS FOR COLOR TELEVISION RECEIVER

George Ralston, Trenton, N.J., assignor to Westinghouse Electric Corporation, East Pittsburgh, Pa., a corporation of Pennsylvania Application March 25, 1955, Serial No. 496,663

8 Claims. (Cl. 178—5.4)

My invention relates to color television receiver apparatus, and more particularly to arrangements for increasing the resolution of black and white pictures reproduced on the picture tube screen of color television receivers.

Color television receivers are built to have an intermediate frequency band pass on the order of 4.1 megacycles. This band pass is wider than in black and white receivers in order to provide correct amplitude response to the color subcarrier. In the monochrome channel of a color television receiver, a trap or filter is provided for the color subcarrier to attenuate any 3.58 megacycle color subcarrier voltage in order to prevent it from reaching the picture tube screen. The trap is necessary because the picture tube has a non-linear characteristic which produces rectification of the subcarrier.

The use of the 3.58 megacycle trap, however, limits the response of the monochrome channel to a somewhat lower value, 3.0 or 3.3 megacycles. When the color television receiver receives monochrome signals, there exists no color subcarrier to produce the above-mentioned rectification and, hence, there is no need for the 3.58 megacycle trap.

In accordance with the present invention, a circuit arrangement is provided for a color television receiver which is operative to short out the 3.58 megacycle trap automatically upon the arrival of incoming monochrome television signals. A 4.1 megacycle monochrome picture will thus be available with a resulting improvement in horizontal resolution of approximately 65 to 90 lines.

It is, therefore, an object of the invention to provide a control circuit for a color television receiver which is operative to increase the resolution of reproduced black and white pictures.

It is another object to provide a control circuit which is operative to increase the response of the monochrome channel of a color television receiver when receiving monochrome television signals.

It is a further object to provide a control circuit for a color television receiver which is responsive to color synchronizing signals and is automatically operative to increase the resolution of reproduced black and white pictures.

It is a still further object to provide a control circuit for a color television receiver which is responsive to color synchronizing signals and is automatically operative to increase the response of the monochrome channel of a color television receiver when receiving black and white television signals.

The present invention together with additional objects and advantages thereof will best be understood from the following description when read in connection with the accompanying drawings, in which.

Figures 1, 2:
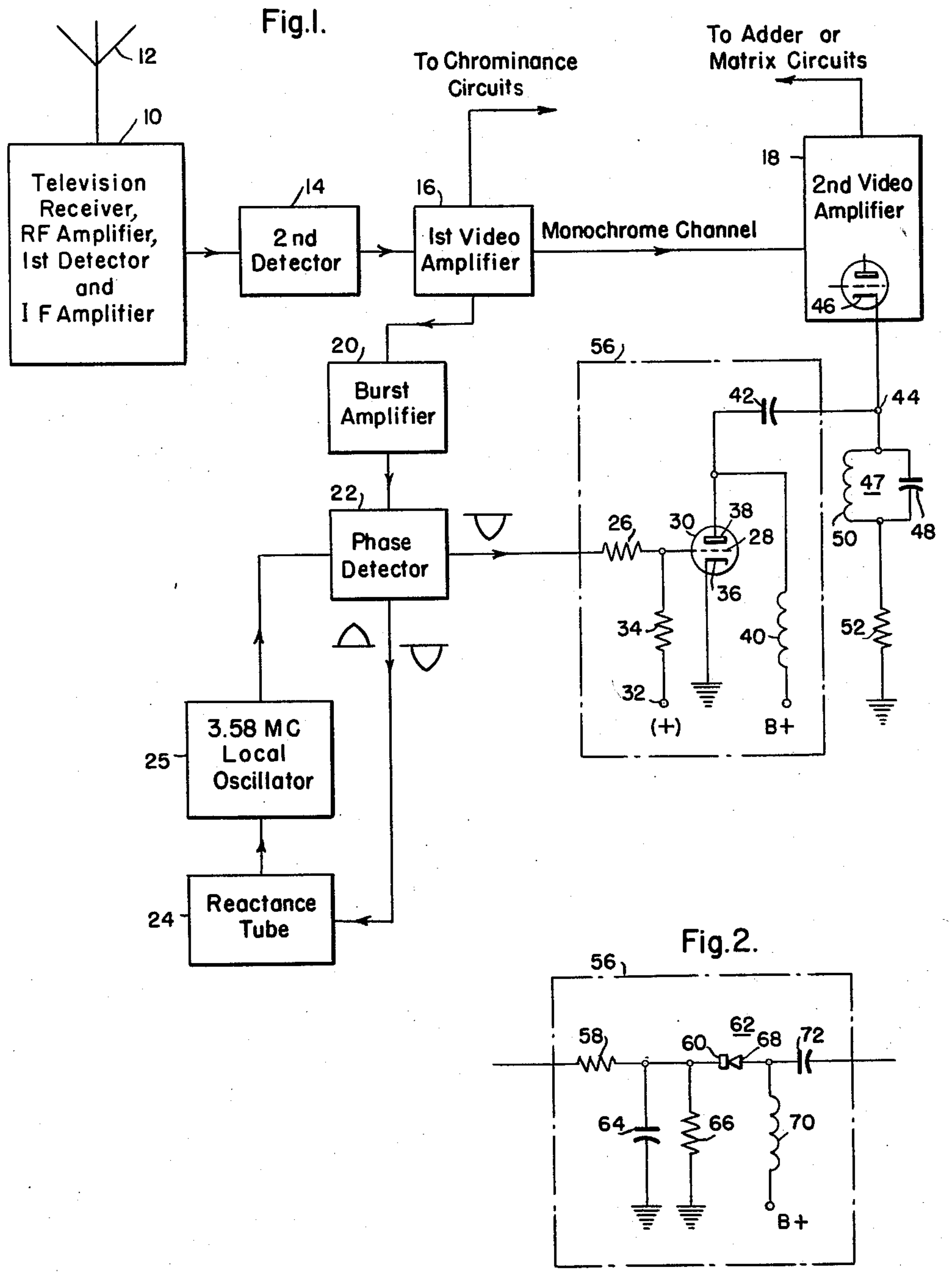
Figure 1 is a partial schematic circuit diagram of a color television receiver apparatus showing one embodiment of the present invention.
Figure 2 is a schematic circuit diagram of a portion of the color television receiver apparatus of Figure 1 and showing another embodiment of the present invention.

Referring to Figure 1 of the drawings, there is illustrated components of a color television receiver comprising a radio frequency amplifier, a first detector which includes a suitable source of heterodyning signals and an intermediate frequency amplifier, all of these elements of known construction, connected in well-known manner, and being indicated schematically in block form and designated by the reference character 10. Radio frequency signals resulting from either monochrome television transmission, or color television transmission in accordance with the National Television System Committee's Standards (NTSC), are conventionally intercepted by the antenna 12 and applied to the input of the radio frequency amplifier included in block 10. The output of the intermediate frequency amplifier included in block 10 is applied to a conventional second detector 14 whose output is in turn applied to a first video amplifier 16 of the receiver.

The first video amplifier 16 is connected to a second amplifier or line driver 18 which is, in turn, connected to conventional adder or matrix circuits (not shown). The amplifier 16 is also connected to a burst amplifier 20 which is, in turn, connected to a phase detector 22, which is of common design as conventionally used in color television receivers. The phase detector 22 is connected to a reactance tube 24 which is, in turn, connected to a local oscillator 25. The output of the local oscillator 25 is connected to the phase detector 22. A connection is also made from a point in the phase detector 22 where a negative voltage is developed when color bursts are being received through a resistor 26 to the control electrode 28 of an electron discharge device 30. The control electrode 28 is connected to the positive terminal 32 of a suitable unidirectional potential source (not shown) through a resistor 34. The cathode 36 of device 30 is connected to ground potential. The anode 38 is connected through an inductance 40 to the positive terminal B+ of a source of unidirectional potential. The anode 38 is also connected through a capacitor 42 to the terminal 44.

The second video amplifier 18 has a cathode 46 which is connected to terminal 44. From terminal 44 connection is made to one terminal of a tuned circuit 47, comprising a capacitor 48 and an inductance 50, the other terminal of this circuit being connected to ground potential through a resistor 52.

The first video amplifier 16 is also connected to the chrominance circuits (not shown) of the color television receiver.

When composite color television signals are intercepted by the antenna 12, they are supplied to the second detector 14 through the components in block 10. At the second detector, the signals are extracted from the picture carrier and are applied to the first video amplifier 16. At the amplifier 16, a portion of the color signal representing color information is applied to the chrominance circuits in the receiver. Another portion of the color signal representing luminance information is applied through the monochrome channel to the second video amplifier 18. From the amplifier 18 the monochrome signal is applied to the adder or matrix circuits in the receiver.

The trap 47 in the cathode circuit of the second video amplifier 18 is tuned to 3.58 megacycles and it limits the response of the monochrome channel to a value lower than 3.58 megacycles.

At the amplifier 16, another portion of the color signal, the color sync burst is applied to the burst amplifier 20 which amplifies the color burst of 8 to 12 cycles of color subcarrier frequency which appears on the back portion of each horizontal sync pulse in the composite color signal. The signal at the output of the burst amplifier 20 is applied to the phase detector 22 which is employed to compare the frequency and phase of the received color sync burst with the frequency and phase of a 3.58 megacycle continuous wave signal generator by the local oscillator 25. If any phase difference exists between the received color sync burst and the 3.58 signal generated by the oscillator 25, a correction voltage is applied to the reactance tube 24. The correction voltage developed by the phase detector 22 will be either a positive or a negative voltage which will cause a change in conduction in the reactance tube 24. The tube 24 acts as a capacitive reactance and will cause a change in the tuning of the local oscillator 25 so that the oscillator will be in proper phase relation with the color burst.

When the color television receiver is tuned to receive signals resulting from a monochrome or black and white transmission, no color sync burst will be received and the positive or negative voltage developed by the phase detector 22 will be small in relation to the voltage developed when a color sync burst is received.

The negative voltage developed by the phase detector 22 is applied to the control grid 28 of the tube 30 which is connected in parallel to the trap 47. The large negative voltage developed in the phase detector 22 when a color sync burst is being received operates to bias the tube 30 to cutoff. Since tube 30 is connected in parallel with the trap 47, an open circuit exists across the trap and the trap presents a high impedance to any 3.58 megacycle color subcarrier voltage which may be present.

The tube 30 is in conducting condition when monochrome signals are being received. The small negative voltage developed in the phase detector 22 at this time does not operate to bias the tube 30 to cutoff, since the positive voltage obtained by way of the terminal 32 counteracts this small negative voltage.

It is seen then that in accordance with the invention, the trap of filter 47 is selectively placed in and out of operation by means of the tube 30 connected in parallel with it, and that the tube 30 normally conducts heavily, shorting the trap 47, but is rendered non-conductive in response to the color sync bursts.

With reference now to Fig. 2, there is shown a schematic circuit diagram of a second embodiment of the invention representing a modification of that portion of Fig. 1 which is included within the dotted rectangle 56.

As discussed above in connection with Fig. 1, the large negative voltage developed in the phase detector 22 when a color sync burst is received is applied through a resistor 58 to the cathode 60 of a diode or crystal 62. The cathode is connected to ground potential through the parallel connection of a capacitor 64 and a resistor 66. The anode 68 is connected through an inductance 70 to the positive terminal B+ of a source of unidirectional potential, and through a capacitor 72 to the terminal 44. Thus, the large negative voltage appearing on the cathode 60 of the device 62 operates to render it non-conductive. The device 62 is in conducting condition when monochrome signals are being received. A small negative voltage appears at this time on the cathode 60, but the positive voltage applied to the anode 68 is large enough to render the device 62 conductive.

While the present invention has been shown in several preferred forms, it should be obvious to those skilled in the art that this invention is not so limited, but is susceptible to various changes and other modifications without departing from the spirit and scope thereof.

I claim as my invention:

1. In television receiver apparatus adapted to receive either monochrome signals or composite color signals including color bursts of color subcarrier frequency, a monochrome channel comprising means to limit the maximum response of said channel to a frequency value less than that of said color subcarrier, and means connected in parallel with said first-mentioned means and responsive to signals indicative of the presence or absence of said composite color signal to maintain said first-mentioned means operative in the presence of said composite color signals or to render said first-mentioned means inoperative in the absence of said composite color signals.

2. In television receiver apparatus adapted to receive either monochrome signals or composite color signals including color bursts of color subcarrier frequency, a monochrome channel comprising means to limit the maximum response of said channel to a frequency value less than that of said color subcarrier, and means connected in parallel with said first-mentioned means and responsive to signals indicative of the presence or absence of said color bursts to maintain said first-mentioned means operative in the presence of said color bursts or to render said first-mentioned means inoperative in the absence of said color bursts.

3. In television receiver apparatus adapted to receive either monochrome signals or composite color signals including color bursts of color subcarrier frequency, a monochrome channel comprising means operative to limit the maximum response of said channel to a frequency value less than that of said color subcarrier, means to separate said color bursts from said composite color signal, a detector operative to compare the frequency and phase of said color bursts with the frequency and phase of a locally-generated signal and to develop control voltages indicative of the presence or absence of said color bursts, means connected in parallel with said first-mentioned means and responsive to said control voltages, said last-mentioned means being effective to render said first-mentioned means inoperative in the absence of said color bursts to thereby increase the maximum response of said monochrome channel to a frequency value greater than that of said color subcarrier.

4. In television receiver apparatus adapted to receive either monochrome signals or composite color signals including color bursts of color subcarrier frequency, a monochrome channel comprising an amplifier having a cathode circuit, said cathode circuit including means operative to limit the maximum response of said channel to a frequency value less than that of said color subcarrier, means to separate said color bursts from said composite color signal, a detector operative to compare the frequency and phase of said color bursts with the frequency and phase of a locally-generated signal and to develop control voltages indicative of the presence or absence of said color bursts, and, means connected in parallel with said first-mentioned means and responsive to said control voltages, said last-mentioned mean being effective to render said first-mentioned means inoperative in the absence of said color bursts to thereby increase the maximum response of said monochrome channel to a frequency value greater than that of said color subcarrier.

5. In television receiver apparatus adapted to receive either monochrome signals or composite color signals including color bursts of color subcarrier frequency, a monochrome channel comprising means operative to limit the maximum response of said channel to a frequency value less than that of said color subcarrier, means to separate said color bursts from said composite color signal, a detector operative to compare the frequency and phase of said color bursts with the frequency and phase of a locally-generated signal and to develop control voltages indicative of the presence or absence of said color bursts, and an electron discharge device connected in parallel with said first-mentioned means and responsive to said control voltages, said electron discharge device being effective to render said first-mentioned means inoperative in the absence of said color bursts to thereby increase the maximum response of said monochrome channel to a frequency value greater than that of said color subcarrier.

6. In television receiver apparatus adapted to receive either monochrome signals or composite color signals including color bursts of color subcarrier frequency, a monochrome channel comprising an amplifier having a cathode circuit, said cathode circuit including means operative to limit the maximum response of said channel to a frequency value less than that of said color subcarrier, means to separate said color bursts from said composite color signal, a detector operative to compare the frequency and phase of said color bursts with the frequency and phase of a locally-generated signal and to develop control voltages indicative of the presence or absence of said color bursts, and an electron discharge device connected in parallel with said first-mentioned means and responsive to said control voltages, said electron discharge device being effective to render said first-mentioned means inoperative in the absence of said color bursts to thereby increase the maximum response of said monochrome channel to a frequency value greater than that of said color subcarrier.

7. In television receiver apparatus adapted to receive either monochrome signals or composite color signals including color bursts of color subcarrier frequency, a monochrome channel comprising means operative to limit the maximum response of said channel to a frequency value less than that of said color subcarrier, means to separate said color bursts from said composite color signal, a detector operative to compare the frequency and phase of said color bursts with the frequency and phase of a locally-generated signal and to develop a control voltage indicative of the presence of said color bursts, an electron discharge device connected in parallel with said first-mentioned means, means for establishing conduction in said electron discharge device to render said first-mentioned means inoperative in the absence of said color bursts, and a connection between said detector and said electron discharge device to apply said control voltage to said electron discharge device with a polarity such that said control voltage cuts off conduction in said electron discharge device, said electron discharge device thus being effective to maintain said first-mentioned means operative in the presence of said color bursts.

8. In television receiver apparatus adapted to receive either monochrome signals or composite color signals including color bursts of color subcarrier frequency, a monochrome channel comprising an amplifier having a cathode circuit, said cathode circuit including means operative to limit the maximum response of said channel to a frequency value less than that of said color subcarrier, means to separate said color bursts from said composite color signal, a detector operative to compare the frequency and phase of said color bursts with the frequency and phase of a locally-generated signal and to develop a control voltage indicative of the presence of said color bursts, an electron discharge device connected in parallel with said first-mentioned means, means for establishing conduction in said electron discharge device to render said first-mentioned means inoperative in the absence of said color bursts, and a connection between said detector and said electron discharge device to apply said control voltage to said electron discharge device with a polarity such that said control voltage cuts off conduction in said electron discharge device, said electron discharge device thus being effective to maintain said first-mentioned means operative in the presence of said color bursts.

References Cited in the file of this patent

UNITED STATES PATENTS

| | | |
|---|---|---|
| 2,713,608 | Sonnenfeldt | July 19, 1955 |
| 2,713,612 | Nero | July 19, 1955 |
| 2,744,155 | Kihn | May 1, 1956 |